United States Patent
Schliebe et al.

(10) Patent No.: US 7,780,083 B2
(45) Date of Patent: Aug. 24, 2010

(54) DEVICE FOR IDENTIFYING METALLIC FOREIGN COMPONENTS

(75) Inventors: Dieter Schliebe, Bad Wünnenberg (DE); Michael Nolte, Brakel (DE); Thomas Nickel, Paderborn (DE)

(73) Assignee: Wincor Nixdorf International GmbH (DE)

(*) Notice: Subject to any disclaimer, the term of this patent is extended or adjusted under 35 U.S.C. 154(b) by 254 days.

(21) Appl. No.: 11/991,195

(22) PCT Filed: Aug. 17, 2006

(86) PCT No.: PCT/EP2006/065393

§ 371 (c)(1),
(2), (4) Date: Feb. 28, 2008

(87) PCT Pub. No.: WO2007/048648

PCT Pub. Date: May 3, 2007

(65) Prior Publication Data

US 2009/0242634 A1 Oct. 1, 2009

(30) Foreign Application Priority Data

Sep. 14, 2005 (DE) ................ 10 2005 043 921

(51) Int. Cl.
*G06K 7/08* (2006.01)
(52) U.S. Cl. ............... 235/449; 235/379; 235/479
(58) Field of Classification Search ............ 235/379, 235/381, 382, 383, 449, 483; 902/8–10
See application file for complete search history.

(56) References Cited

U.S. PATENT DOCUMENTS

| | | | |
|---|---|---|---|
| 3,697,972 A | 10/1972 | Brown et al. | |
| 4,207,520 A | 6/1980 | Flora et al. | |
| 6,422,475 B1 | 7/2002 | May et al. | |
| 6,491,216 B1* | 12/2002 | May | 235/375 |
| 7,100,829 B2* | 9/2006 | Okada | 235/439 |

FOREIGN PATENT DOCUMENTS

| | | |
|---|---|---|
| EP | 0 965 960 A2 | 12/1999 |
| EP | 1 394 728 A | 3/2004 |
| EP | 1 530 150 A1 | 5/2005 |
| GB | 1 548 239 A | 7/1979 |
| WO | WO-03/088136 A2 | 10/2003 |

OTHER PUBLICATIONS

International Search Report (in English) and Written Opinion of the International Searching Authority (in German) for PCT/EP2006/065393, mailed Nov. 30, 2006; ISA/EP.

* cited by examiner

*Primary Examiner*—Seung Lee
(74) *Attorney, Agent, or Firm*—Harness, Dickey & Pierce, P.L.C.

(57) ABSTRACT

The invention describes a device (10) and a method for protecting a self-service terminal against fraudulent installation of spying-out apparatuses for spying-out information, which device and method are based on the detection of metallic components of the spying-out apparatus. The device (10) comprises a control unit (12) and a peripheral (24) which is connected to the control unit (12) via an interface (26, 28, 30). The sound card (24) has an output for an analog output signal, to which output a coil (52, 56) for generating a primary electromagnetic field can be connected, and an input for an analog detection signal, to which input a second coil (60, 64) for detecting a secondary electromagnetic field, which is influenced by the interaction of the primary electromagnetic field with the metallic components of the spying-out apparatus, can be connected. The control unit (12) actuates the sound card (24) in order to generate the primary electromagnetic field via the interface (26, 28, 30) and/or receives the digitized detection signal and analyzes said signal in order to determine whether a foreign metallic object is present.

20 Claims, 1 Drawing Sheet

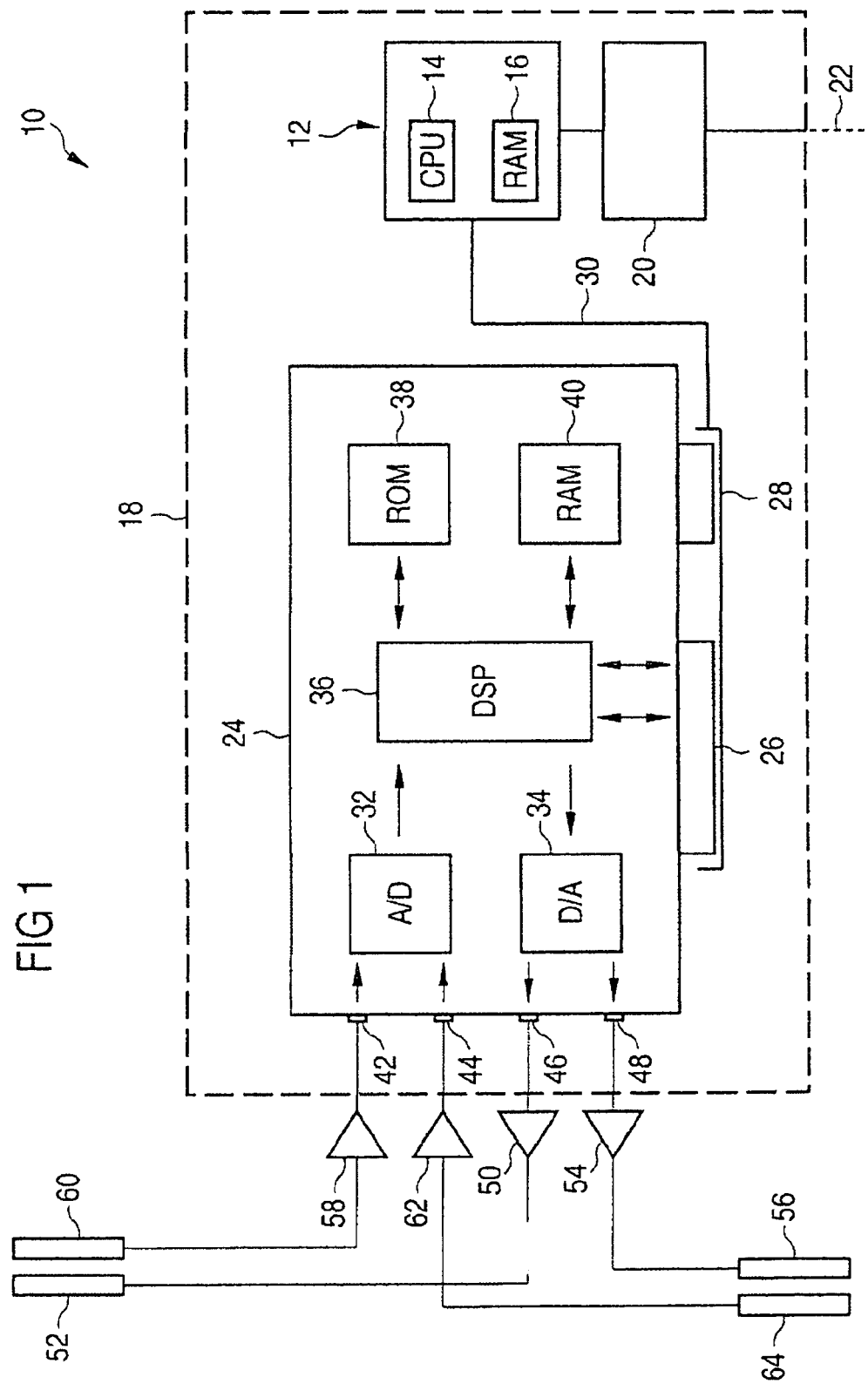

DEVICE FOR IDENTIFYING METALLIC FOREIGN COMPONENTS

CROSS-REFERENCE TO RELATED APPLICATIONS

This application is a U.S. National Stage Application of International application No. PCT/EP2006/065393, filed Aug. 17, 2006 and published in German as WO 2007/048648 A1 on May 3, 2007. This application claims the benefit of German Application No. 10 2005 043921.7, filed Sep. 14, 2005. The disclosure(s) of the above applications are incorporated herein by reference.

TECHNICAL FIELD

The present invention relates to a device for identifying the metallic foreign components which are fitted, in particular, to an input and/or output device of a self-service terminal, such as a cash machine, statement printer and/or information or transaction terminal, by third parties with fraudulent intent in order to spy-out information. Said invention also relates to a method according to claim 14.

PRIOR ART

A device of this type is known, for example, from U.S. Pat. No. 6,422,475 B1. Said document describes an automatic teller machine with a card-reading device for reading a magnetic strip of a customer's bank card, in which machine a spying-out apparatus with a small, additional magnetic track reader which is as inconspicuous as possible has been fitted directly in front of the insertion slot of the genuine card reader of the automatic teller machine by a third party with fraudulent intent. When a customer inserts his bank card into the genuine card reader of the automatic teller machine, the magnetic track of said bank card is read by this foreign card reader too, as a result of which the third party acquires the customer and account information. A copy of the bank card can now be manufactured with this information. If the third party is also able to spy-out the personal identification number (the so-called PIN) associated with the bank card, the third party is able to use the forged bank card and the spied-out PIN at cash machines to withdraw cash from the account of the person who was spied on.

This described fraudulent procedure is called card abuse or "skimming" in technical circles. The spying-out apparatuses have been increasingly refined in recent years, both in terms of their small size and also their visual camouflaging, so that it is very difficult to identify the spying-out apparatuses.

The identification device from the abovementioned document U.S. Pat. No. 6,422,475 B1 detects that an additional magnetic track reader has been fitted with the aid of a metal detector on the basis of the metallic components of the magnetic head. To this end, an electromagnetic field is generated which, in turn, generates in the detection objects, if they are metallic, a secondary electromagnetic field which is identified by a detection coil and is used for evaluation purposes.

SUMMARY OF THE INVENTION

However, this known metal detection is very cost-intensive. In addition, the known device is relatively inflexible with respect to further technical developments of the spying-out devices.

However, a cost-effective detection device is specifically desirable for security reasons, since all cash machines of a bank should be equipped with these detection devices as far as possible. Furthermore, flexible adaptation of the detection device to technically modified front structures is desirable since experience has shown that persons acting with fraudulent intent adapt to the protection devices of the self-service terminals and are very resourceful in working to bypass them.

TECHNICAL OBJECT

The invention is therefore based on the object of further developing a device of the type mentioned in the introduction such that it can be flexibly adjusted to further technical developments of sensors for self-service machines for manipulation purposes. In addition, it is desirable, from a cost point-of-view, for remote control of the detection device to be possible.

TECHNICAL SOLUTION

This object is achieved by a device of the type mentioned in the introduction in that a sound card is used for generating a primary electromagnetic field. The output of the sound card is connected to a first coil to which an analog output signal of the sound card is forwarded. A second coil detects a secondary electromagnetic field, which is generated by metallic components of sensors of a spying-out device, and is connected to an input of the sound card. The sound card is controlled by a control unit with regard to the frequency and amplitude of the signal to be output. The incoming signals of the sound card are also forwarded to the control unit for further processing and detection of metallic foreign bodies.

A sound card is a standardized product which is readily available at low cost for processing external or generating internal sound signals. Sound cards are peripherals which are connected to the central data processing unit of a computer via a data bus, for example via a plug connection with a PCI bus, via a USB connection or an IEEE-1394 connection. Sound cards are designed to convert digital signals into analog audio signals which are output via loudspeakers or headphone connections of the sound card. Furthermore, most sound cards have a microphone input and a music input via which the analog audio data can be input into the sound card. These analog audio signals are then digitized by the sound card.

According to the present invention, a sound card, which is originally designed to process audio signals, is used to generate an electromagnetic field and is therefore used for metal detection. By suitable reprogramming, it is possible to use the sound card in this way. As a result, a standard component can be used and the detection unit can be produced substantially more cost-effectively overall. It goes without saying that two sound cards can be used instead of one sound card, one of which two sound cards is used to generate the primary electromagnetic field and the other of which two sound cards is used to detect the secondary electromagnetic field.

It should be noted here that, in accordance with their original purpose, sound cards are designed to process signals with frequencies in the audible range, that is to say for a sound frequency of between 20 Hz and 20 kHz. Sound cards accordingly operate at a sampling rate of 44 kHz or 96 kHz and a sampling depth of 16 bits (65.536 sound increments, HiFi quality) or 24 bits. The sampling rate is therefore lower than would be the case in a digital signal processor which was specially selected or designed for metal detection. However, it was found that a sampling rate of 44 kHz is sufficient to reliably detect small amounts of metal, provided that suitable analysis software is used. Since, in the device of the present invention, the analysis of the detection signals takes place in a control unit which is connected to the sound card and on which any desired software can be easily installed and run, a large number of powerful and proven analysis programs can be accessed for signal analysis.

The sound card can preferably be actuated by the control unit such that it generates a digital signal and outputs it to the D/A converter in which said signal is converted into the analog output signal. In this case, the digital signal can be generated at least partly by frequency-modulation synthesis in the sound card. In addition or as an alternative, the digital signal can be generated in the sound card at least partly by combination of digital signal samples.

A large number and variety of output signals for generating a primary electromagnetic field can therefore be easily forwarded to the first coil. The variety of output signals which can be generated makes it considerably more difficult for fraudsters to develop spying-out apparatuses which are not detected by the identification device.

In an advantageous development, the control unit selects the output signals to be output from amongst a large number of output signals on a random basis. This provides the identification device with a greater degree of flexibility.

Instead of a sound card in the strictest sense, an audio circuit which is integrated on the main printed circuit board of the central data processing unit and functions in substantially the same way as a conventional sound card could also be used. An integrated audio circuit, often called a "sound-on board", is also called a "sound card" within the scope of this description.

Further advantages and features of the present invention can be found in the following description in which an exemplary embodiment of the invention is described with reference to the drawing.

BRIEF DESCRIPTION OF THE DRAWINGS

FIG. 1 shows a schematic illustration of a device for identifying metallic foreign components, in particular for protecting a self-service terminal against the fraudulent installation of spying-out apparatuses.

FIG. 1 shows a schematic illustration of a device 10 for identifying metallic components which have been fitted, in particular, to an input and/or output device of a self-service machine, such as a cash machine, statement printer or information terminal, with fraudulent intent. The device 10 comprises a control unit 12 with a central processor (a CPU) 14 and a working memory (RAM) 16. The central processor 14 is advantageously the main processor of a PC whose housing 18 is indicated by dashed lines. The control unit 12 is connected to a data line 22 for remote data transmission via a network card 20.

The housing 18 of the PC likewise contains a sound card 24. The sound card 24 is in the form of a plug-in card and is plugged into an associated plug-in apparatus 28 by way of a plug-in section 26 and is connected to the control unit 12 via a PCI bus 30. The use of the sound card in a device for protecting a self-service terminal against the fraudulent installation of spying-out apparatuses has two particular advantages. Firstly, a sound card already has the suitable connections, and the program interfaces required to reprogram the sound card for the unintended use exist. Secondly, sound cards are available as mass-produced products at low cost, with the result that the costs of the device as a whole can be considerably reduced.

The sound card 24 has an A/D converter 32, a D/A converter 34 and a microprocessor 36 which can be a sound chip or a digital signal processor (DSP). A ROM 38 and a RAM 40 are connected to the microprocessor 36.

The sound card 24 also has a microphone input 42 and a music input (a so-called "line-in" connection) 44. The sound card 24 also has a headphone output 46 and a loudspeaker output 48. A first coil 52 which represents a first inductance for generating a primary electromagnetic field is connected to the headphone output 46 via a signal amplifier 50. The first coil 52 is located in an area which should be protected against the installation of a spying-out apparatus, for example in the immediate vicinity of a card-reading device of the self-service terminal.

A second coil 60 for detecting a secondary electromagnetic field which is influenced by the interaction of the primary electromagnetic field with the metallic components of a sensor of a spying-out apparatus is connected to the microphone input 42 via a further amplifier 58. The second coil 60 forms a second inductance.

A further coil 56, which likewise forms a first inductance for generating a primary electromagnetic field, can be connected to the loudspeaker output 48 via a further amplifier 54. The coil 56 is arranged in another area which should be monitored for protection against spying-out apparatuses, for example in the vicinity of a keypad for entering a personal identification number (PIN input keypad) or in an area which is suitable for spying-out the PIN and in which a small camera could therefore be installed with fraudulent intent. In a similar way, a further coil 64 is connected to the music input 44 via an amplifier 62 as a second inductance for detecting a secondary electromagnetic field.

BEST WAY OF IMPLEMENTING THE INVENTION

The device is based on the detection of metallic components which are necessarily contained in spying-out apparatuses. For the purpose of metal detection, a primary electromagnetic field is generated by each of the first inductances 52 and 56. Each primary electromagnetic field induces eddy currents in metallic objects which may be present, said eddy currents, for their part, generating a secondary electromagnetic field which is detected.

To this end, the central processor 14 of the control unit 12 actuates the microprocessor 36 of the sound card 24 in such a way that said sound card outputs a digital signal to the D/A converter. This digital signal is converted into an analog output signal in the D/A converter 34 and output at one of the outputs 46 or 48. This analog output signal is amplified in the amplifier 50 or 54 and forwarded to the first inductances 52 and 56 which emit a corresponding first electromagnetic field.

Although only two outputs 46, 48 are occupied in the simplified illustration of FIG. 1, more than two first inductances 52, 56 can be connected in an actual application, in order to simultaneously output a plurality of output signals at different frequencies to each area to be monitored. A sound card typically has five to seven output channels in order to be able to generate surround sounds which can all be used.

Furthermore, the digital signals can be generated by frequency-modulation synthesis. However, the digital signals can also be generated at least partly by a combination of digital signal samples, so-called wavelets. These digital samples can be stored in the storage means 38, 40 of the sound card or else in the working memory 16 of the control unit 12 to which the sound card 24 preferably has direct access. A large number of different signals can be generated in this way. Programs for generating different output signals can be transmitted to the computer during the course of remote maintenance via the data line 22 and then be loaded into the working memory 16 of the control unit 12. The described device is therefore extremely flexible in terms of the generation of output signals in that respect.

If the output signals are selected on a random basis, it is impossible for a fraudster to predict which output signals will be used to carry out the metal detection, as a result of which it is made considerably more difficult to design a spying-out apparatus in which the metal detection would not be detected.

The second inductances 60 and 64 are located in the secondary electromagnetic field which, as described above, is generated or influenced by the interaction of the primary electromagnetic field with the metallic components of the spying-out apparatus. The voltages which are induced in the second inductances 60 and 64 on account of the secondary electromagnetic fields are amplified in the amplifiers 58 and 62 and input into the sound card 24 as analog detection signals via the connections 42 and 44. The analog detection signals are digitized in the A/D converter 32 and subsequently processed in the microprocessor 36 of the sound card 24. The processed digital detection signals are transmitted to the control unit 12, in which they are analyzed, via the bus connection 30.

In order to analyze the digital detection signals, known and tested program libraries can be accessed, because the actual analysis of the data takes place on a customary PC here. If the need to improve the analysis programs is identified after the installation of the device 10 on a self-service machine, these analysis programs can be easily upgraded by the updated programs being transmitted to the central data processing unit 12 via the data line 22.

An important aspect of the analysis program according to one development is that metal detection is not carried out per se, but a change in the metal environment compared to the non-manipulated self-service terminal is detected. To this end, the received digital detection signal is compared with a reference signal which corresponds to the previously transmitted output signal. This reference signal reflects the normal metallic environment of the non-manipulated self-service terminal. Only when deviations in the received detection signal are produced compared to the reference signal is this judged to be an indication of possible manipulation.

On account of the option of calibrating the device, it is not necessary for the first inductances 52, 56 and the second inductances 60, 64 to be arranged in locations in the vicinity of which there are no metallic components of the non-manipulated self-service terminal.

The calibration option and the resulting unlimited options for arranging the inductances 52, 56, 60, 64 are a further example of the improved flexibility of the described device.

Depending on the configuration of the sound card, the amplifiers 50, 53, 58 and 62 may possibly be superfluous. The intensity of the detection fields can be regulated by controlling the volume of the sound card.

The invention claimed is:

1. A device for identifying metallic foreign components which are fitted to an input and output device of a self-service machine, by third parties with fraudulent intent in order to spy-out information, characterized by
   a control unit with a central processor and a working memory,
   a sound card with an interface to the control unit and at least one output and at least one input;
   whereby the output of the sound card is connected to a first coil for generating a primary electromagnetic field to the output; and
   whereby the input of the sound card is connected to a second coil for detecting a secondary electromagnetic field which is generated by the interaction of the primary electromagnetic field with the metallic foreign components,
   and the sound card being actuated by the control unit via the interface in order to generate the primary electromagnetic field and an analog output signal been forwarded to the coil,
   and, when the secondary electromagnetic field is generated by metallic foreign components, an analog input signal being passed to the sound card by the second coil, and the sound card processing the signal further and forwarding the signal to the control unit,
   the control unit analyzing and evaluating the incoming signal to determine whether metallic foreign bodies are present;
   wherein the coil for generating the primary electromagnetic field and the coil for detecting the second electromagnetic field are arranged in the region of the input and output device of the self-service machine; and
   wherein the input and output device of the self-service terminal is a card-reading machine.

2. The device as claimed in claim 1, wherein the coils have a ferrite core.

3. The device as claimed in claim 1, wherein the sound card comprises a digital/analog converter for the output signal and an analog/digital converter for the input signal.

4. The device as claimed in one claim 1, wherein the sound card forwards frequency-modulated signals to the first coil.

5. The device as claimed in claim 4, wherein the frequency-modulated signals are generated at least partially by combination of digital signal samples.

6. The device as claimed in claim 5, wherein the sound card comprises a storage means for storing the digital signal samples.

7. The device as claimed in claim 5, wherein the control unit is designed to generate a large number of different control signals.

8. The device as claimed in claim 7, wherein the control unit selects the control signals to be output from amongst said large number of control signals on a pseudo-random basis.

9. The device as claimed in claim 1, wherein the control unit compares the received digital detection signal with a reference signal and, when there is a predetermined deviation between the reference signal and the digital detection signal, determines the detection of a metallic object.

10. The device as claimed in claim 1, wherein the control unit measures the time during which the presence of a foreign metallic object is determined and outputs an alarm signal if the measured time exceeds a predetermined value.

11. The device as claimed in claim 10, wherein the self-service terminal is shut down when the alarm signal is output.

12. A method for identifying metallic foreign components which can be fitted to an input and output device of a self-service machine, wherein a sound card is actuated by a control unit via an interface, an analog signal for generating a primary electromagnetic field being forwarded from an output of the sound card to a first coil, and a detection signal being passed to an input of the sound card by a second coil for detecting a secondary electromagnetic field which is generated by the interaction of the primary electromagnetic field with the metallic components, and the control unit actuating the sound card in order to generate the primary electromagnetic field via the interface, and, when a second electromagnetic field is generated by metallic components, the sound card forwarding a control signal to the control unit via the interface, and the control unit analyzing and evaluating the control signal to determine whether metallic foreign bodies are present.

13. A device for identifying a metallic foreign object positioned proximate to a card reader of a self-service card reading machine by a third party having fraudulent intent, the device comprising:
- a control unit including a processor and a memory;
- a sound card including:
  - an interface with the control unit;
  - a microprocessor;
  - an output;
  - a digital to analog converter associated with the output;
  - an input; and
  - an analog to digital converter associated with the input;
- a first conductor proximate to the card reader and connected to the output, the first conductor is operable to generate a first electromagnetic field;
- a second conductor proximate to the card reader and connected to the input, the second conductor is operable to detect a second electromagnetic field generated by a disturbance in the first electromagnetic field caused by the metallic foreign object;
- wherein the first magnetic field is generated according to control parameters set by the control unit, the control parameters are processed by the microprocessor and transferred to the first conductor after being converted into an analog signal by the digital to analog converter; and
- wherein voltage induced in the second conductor by the second electromagnetic field is input into the sound card as a detection signal, digitized by the analog to digital converter, processed by the microprocessor, and transmitted to the control unit where the detection signal is compared to a reference signal representing a metallic environment of the card reader without the foreign object to determine if the foreign object is present.

14. The device of claim 13, wherein the control parameters are included in frequency-modulated signals.

15. The device of claim 14, wherein the frequency-modulated signals are generated at least partially by combination of digital signal samples.

16. The device of claim 15, wherein the sound card comprises a storage means for storing the digital signal samples.

17. The device of claim 13, wherein the control unit is operable to generate multiple different control parameters.

18. The device of claim 17, wherein the different control parameters are randomly generated.

19. The device of claim 13, further comprising a first amplifier operable to amplify the control parameters and a second amplifier operable to amplify the detection signal.

20. The device of claim 13, further comprising a third conductor located proximate to an area of the machine to be monitored and connected to another output of the sound card, the third conductor operable to generate a third electromagnetic field; and
- a fourth conductor connected to another input of the sound card, the fourth conductor is operable to detect a fourth magnetic field generated by a disturbance in the third magnetic field caused by another metallic foreign object.

* * * * *